United States Patent [19]

Antoine

[11] Patent Number: 5,311,505
[45] Date of Patent: May 10, 1994

[54] METHOD AND DEVICE FOR MULTIPLEXING

[75] Inventor: Mathieu Antoine, Brignold, France

[73] Assignee: Hewlett-Packard Company, Palo Alto, Calif.

[21] Appl. No.: 940,215

[22] Filed: Sep. 8, 1992

[30] Foreign Application Priority Data

Sep. 9, 1991 [FR] France .................. 91 11396

[51] Int. Cl.$^5$ .................. H04L 12/20; H04J 3/16; H04J 3/22
[52] U.S. Cl. .................. 370/56; 370/84; 370/85.8; 370/95.2
[58] Field of Search .................. 370/84, 85.8, 95.2, 370/112, 56; 340/825.54, 825.08

[56] References Cited

U.S. PATENT DOCUMENTS

| | | | |
|---|---|---|---|
| H696 | 10/1989 | Davidson | 370/95.2 |
| 4,380,065 | 4/1983 | Hirtle et al. | 370/85.8 |
| 4,658,152 | 4/1987 | Walters . | |
| 4,792,944 | 12/1988 | Takahashi et al. . | |
| 4,937,815 | 6/1990 | Lighthart | 370/95.2 |

FOREIGN PATENT DOCUMENTS

406925A1 1/1991 European Pat. Off. .

OTHER PUBLICATIONS

J. P. Vorstermans et al., "Layered ATM Systems and Architectural Concepts for Subscribers' Premises Networks," *IEEE Journal on Selected Areas in Communications*, (Dec. 1988), No. 9, pp. 1545-1555.

S. H. Lee, "An Integrated Transport Technique for Circuit and Packet Switched Traffic," *IEEE INFOCOM '88 Proceedings*, New Orleans, Mar. 1988, pp. 0110-0118.

*Primary Examiner*—Wellington Chin
*Attorney, Agent, or Firm*—Lowe, Price, LeBlanc & Becker

[57] ABSTRACT

The invention concerns a method for transferring data from a plurality of serial channels (1-6) on a parallel channel. To each serial channel is associated a buffer memory in which are stored the data arriving on the serial channel. Some of the serial channels (1-2) operate at a high speed and the others (3-6) at lower speeds. The method consists in processing a buffer associated to a channel as many times less as the channel is slower than a high speed channel over a number of periods equal to the high speed divided by the speed of the processed channel.

9 Claims, 2 Drawing Sheets

METHOD AND DEVICE FOR MULTIPLEXING

BACKGROUND OF THE INVENTION

The present invention relates to multiplexers used in computer systems and more particularly to a multiplexer comprising an important number of asynchronous channels which can function at different transmission speeds.

Figure 1:
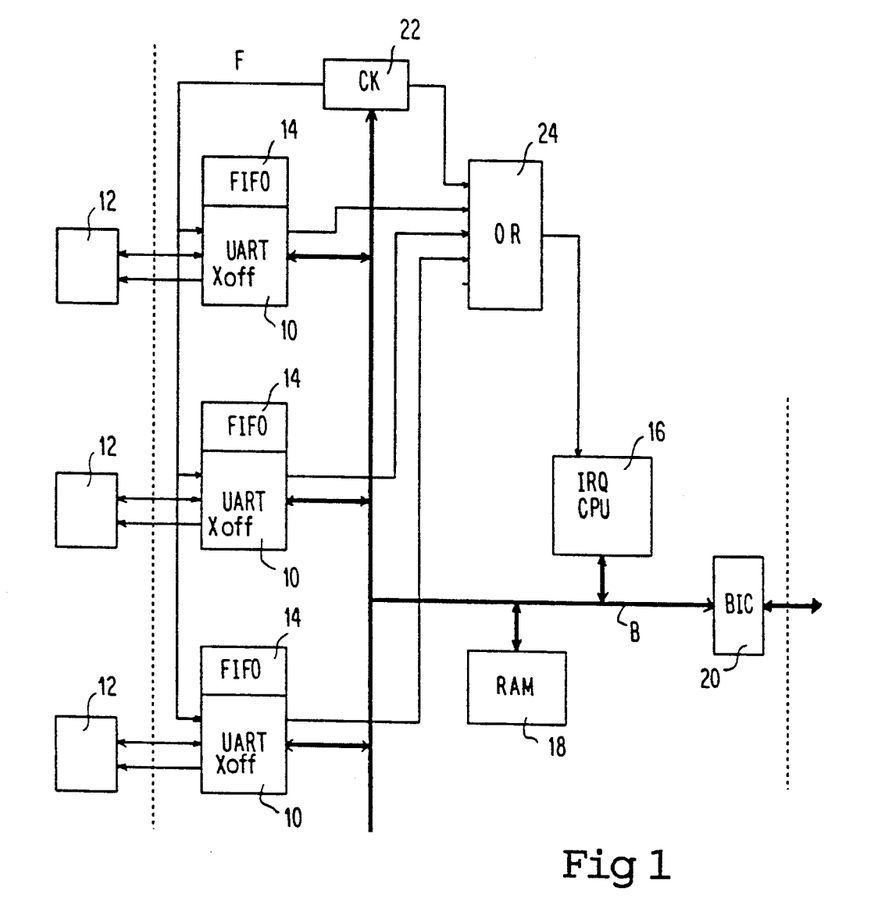
FIG. 1, previously described, shows a conventional multiplexer in which the invention can be carried out.

FIG. 1 shows a simplified schematic diagram of a multiplexer in a computer system. The elements of the multiplexer are included between two vertical dashed lines. The multiplexer comprises a plurality of UARTs (Universal Asynchronous Receiver/Transmitters) 10 connected through serial communication lines, such as RS232 lines, to exterior elements 12 such as terminals, peripherals or other computer systems. A first-in first-out (FIFO) buffer 14 is associated to each of the UARTs. Hereinafter, a group including a serial connection, a UART, and a FIFO will be called a channel C and only the case where the exterior elements 12 transmit data will be studied.

A data and address bus B interconnects each channel, with a microprocessor (CPU) 16, a memory (RAM) 18, and an interface circuit (BIC) 20 between bus B and an external bus of the computer system.

It can be considered that in the FIFOs, data are piled up by order of arrival, the bottom datum (the first one) being withdrawn from the pile and presented on the data bus when the FIFO is read-selected by an address. The read data is then transferred to the RAM 18 before it is transferred to the external bus. It will be supposed hereinafter that the data are characters.

The communication protocol of each of the channels, especially the transmission speed, is determined by a register (not shown) of the associated UART, which can be programmed through bus B. The transmission speed is given by a signal F provided to each UART by a clock circuit (CK) 22 which can eventually provide an additional signal 12 of programmable frequency. It is usual to have a transmission speed comprised between 300 bauds and 38.4 kilobauds. This transmission speed, hereinafter channel speed, can attain the frequency of signal F. The slower transmission speeds are obtained in the UARTs from signal F by dividing its frequency by powers of 2.

Presently, it is attempted to increase the number of channels and/or the maximum transmission speed without increasing the power of the microprocessor, that is the frequency at which the microprocessor functions, or to choose a less powerful microprocessor for a given number of channels. This is attempted knowing that the multiplexer will be unable to manage all the channels if the latter all receive characters at the maximum speed, but also knowing that it is more likely to only have a limited number of channels operating at high speed. It will be supposed hereinafter that the multiplexer is in this more realistic situation.

The incapacity of managing the channels results in an overflow of the FIFOs due to the fact that the microprocessor does not have the time to transfer the characters into the RAM, or results in an overflow of the RAM due to the fact that the microprocessor does not have the time to transfer the characters to the external bus. When a FIFO overflow occurs, the corresponding UART transmits to the associated circuit 12 a signal, Xoff, indicating to the latter that it must stop transmitting. In general, signal Xoff is sent as soon as a predetermined fraction of the FIFO is filled in order to leave a security margin, because circuit 12 could still transmit a few characters after receiving signals Xoff or even ignore this signal if the circuit is designed to not use this signal. The FIFOs are generally of small size, for example 16 characters, and signal Xoff is sent as soon as a FIFO is half full.

The multiplexer of FIG. 1 can conventionally operate according to one of three modes according to the programming of the UARTs, and of clock CK (for the third mode).

A first mode is an interrupt per character mode. In this mode, as soon as a character arriving on a channel is written in the corresponding FIFO, the UART asserts an interrupt request I1 which is provided to an interruption input IRQ of the microprocessor through an OR gate 24. At the same time, the UART writes in a not shown register data corresponding to the number of the channel. Then the microprocessor interrupts its task, reads in the above register the number of the channel to process, and polls the corresponding channel. By polling a channel, it is understood that it is checked whether the corresponding FIFO is empty and, if not, transferring its content to the RAM.

Figure 2:
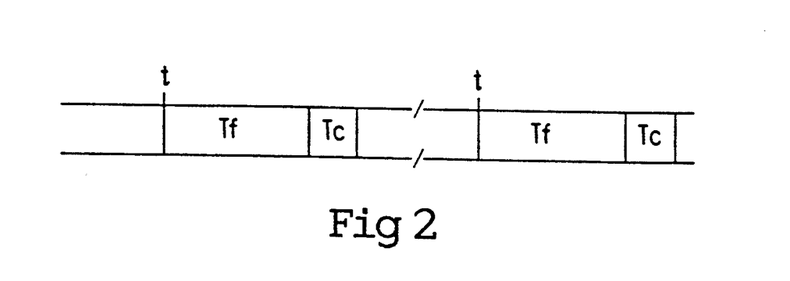
FIGS. 2 to 4, previously described, represent processing times in conventional multiplexers.

FIG. 2 symbolically shows processing durations according to this first mode. Characters arrive at random moments t. From a moment t, an interruption is generated and an interruption processing time interval Tf is started. At the end of interval Tf, a character processing interval Tc starts. If a character arrives when the preceding character has not yet been processed, the interruption is memorized and is processed at the end of interval Tc of the preceding character.

This first operating mode is very disadvantageous. Indeed, the interruption processing time Tf is such greater than the character processing time Tc. For example, if the microprocessor is a series 68000 of MOTOROLA operating at 16 MHz, time Tf is approximately equal to 4Tc. Furthermore, the arrival of a character in the FIFO of a channel operating at a maximum frequency of 38.4 kilobauds is greater that Tf+Tc; hence, for a same interruption, only one character at the time can be processed. Thus, supposing that a continuous flow of characters arrives on the channels, the processing efficiency of the characters is $$Tc/(Tf+Tc) \approx 1/5.$$

A second possible operating mode is the continuous mode. In this mode, the UARTs do not send interruptions and the microprocessor executes in an endless loop a main program comprising a sub-program for polling all the channels. It is chosen, either by inserting delays in the main program if the execution time of the latter is too short, either by multiplying the number of polling sub-programs in the main program if the execution time of the latter is too long, to render the means time Te elapsed between two polls substantially equal to the time its takes to fill a FIFO at the maximum transmission speed to the point an Xoff signal is sent. Hereinafter, this time will be called "minimum time for partial filling". This time Te thus varies from one poll to the other as a function of the amount of tasks to be done by the microprocessor in the main program and in the subprogram(s).

Figure 3:
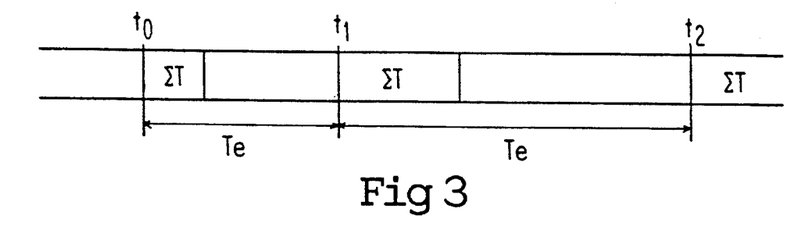

FIG. 3 symbolically shows the time elapsed during the execution of the loops of the main program. It is supposed in this figure that the main program comprises one polling subprogram which is executed at the start of the main program. Moments t0, t1 and t2 are shown indicating the beginning of each main program execution.

At moment t0, the character flow on the channel is low, the execution time $\Sigma T$ of the sub-program is low as well as the total time Te=t1−t0 for executing the loop as the main program is then only essentially in charge of transferring a low number of characters stored in the RAM to the external bus.

At moment t1, it is supposed that the character flow is more important. Not only time $\Sigma T$ increases, but also the transferring time of the characters from the RAM to the external bus. Thus, the time increase of interval Te=t2−t1 is greater than the only time increase of interval $\Sigma T$.

This second operating mode is much more convenient than the previous one because the microprocessor must not process interruptions. However, if the character flow is great, time Te can become greater than the minimum time of partial, or even total, filling. In this case, a FIFO of a maximum speed channel overflows, or at least, attains the filling state which causes a signal Xoff to be sent, which is tried to be avoided.

A third operating mode is a periodical interruption mode. This operating mode is similar to the previous one, except that the polling sub-programs are periodically executed. In order to achieve this, an interruption signal 12 is provided to the microprocessor, the period of which is equal to the minimum time of partial filling of a FIFO. This interruption signal 12, as shown in FIG. 1, is provided by clock CK to the input IRQ of the microprocessor through OR gate 24. The frequency of the interruption signal 12 is obtained by dividing the frequency of signal F by a factor which can be programmed in the clock circuit through bus B.

Figure 4:
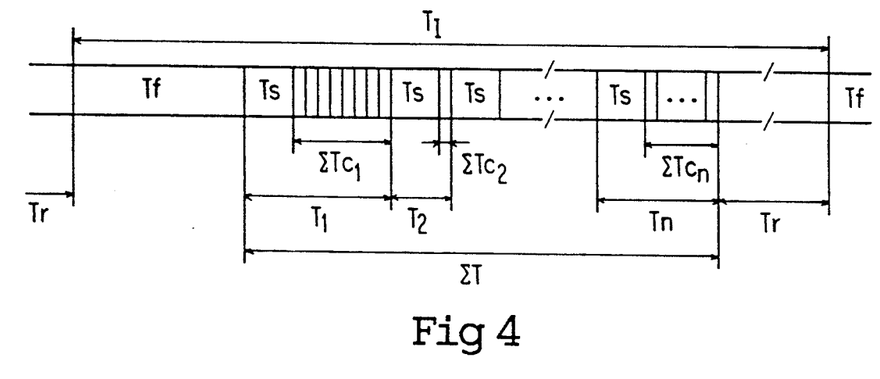

FIG. 4 symbolically shows a period $T_I$ of interruption signal 12. This period is sub-divided in a plurality of time intervals. At the beginning of the period, a constant time interval Tf starts. This time interval corresponds to the interruption processing time by the microprocessor. This time interval is followed by time intervals T1, T2... Tn corresponding respectively to the polling of each of the channels C1 to Cn. The intervals T1 to Tn, the sum of which is equal to $\Sigma T$, are each sub-divided in a constant time interval Ts which corresponds to the time necessary for selecting a channel and in a time interval $\Sigma Tc$ which is the sum of the times Tc for treating the characters stored in the FIFO of the channel. A variable time interval Tr occupying the remaining of period $T_I$, is the time remaining for the microprocessor to achieve its other tasks, especially transferring the characters from the RAM to the external bus. When interval Tr is sufficiently great, the microprocessor can at each period transfer the whole content of the RAM to the external bus. But if it is too small, this transfer must be distributed on a plurality of periods, hoping that the RAM does not continue to fill too quickly.

With respect to the previous mode, this operating mode has, for each period $T_I$, an additional inactivity time Tf corresponding to the processing of an interruption. This operating mode is thus slightly less efficient than the previous one but it is more reliable because period $T_I$ does not vary. The means character processing efficiency with respect to a period $T_I$ is expressed by $$r = \frac{m \cdot Tc}{Tf + n \cdot Ts + m \cdot Tc}$$

wherein n designates the number of channels and m the mean number of characters arriving per period. It will be noted that this efficiency increases with m and thus that its value is the greatest when all channels receive characters at maximum speed. This mode happens to be the most efficient when all channels are operating at maximum speed.

However, as previously mentioned, it is much more likely that a limited number (eventually null) of the channels operate at maximum speed, the other channels operating at lower speeds. Then, the above efficiency decreases substantially and represents an obstacle if it is desired to increase the number of channels. If it is supposed, for example, that channel C1 corresponding to interval T1 operates at maximum frequency, that period $T_I$ corresponds to the arrival of 8 characters at this frequency in the FIFO, and that channel C2 corresponding to interval T2 operates at a speed 8 times smaller than the maximum speed, at each period $T_I$, 8 characters will be processed during interval T1 and only one during interval T2. Actually, an interval Ts will have been spent for 8 characters and an additional interval Ts will have been spent for one character. If other channels operate at still smaller speed, additional intervals Ts will be spent for no characters. It will be noted that, in such a case, term n·TS in the expression of the efficiency r increases with respect to terms m·Tc, which causes a decrease of the efficiency.

Thus, the more channels there are operating at low speeds with respect to channels operating at high speeds, the more the character processing efficiency decreases and the more the possibility of managing additional channels is diminished.

SUMMARY OF THE INVENTION

An object of the invention is to provide a method allowing to obtain an increased character processing efficiency in a multiplexer, having channels operating at different speeds.

Another object of the invention is to provide a multiplexer which can have an increased number of channels operating at different speeds with a microprocessor of a given power.

Another object of the invention is to provide a multiplexer having a reduced power microprocessor for a given number of channels operating at different speeds.

Another object of the invention is to provide a multiplexer having channels of a greater maximum speed with a microprocessor of a given power.

These objects are achieved thanks to a method for transferring data from a plurality of serial channels operating at respective speeds on a parallel channel, a buffer memory being associated to each serial channel, in which are stored data arriving on said serial channel, the method comprising the step of polling each channel once every predetermined number of time intervals of a succession of time intervals and then transferring the data stored in the associated buffer to the parallel channel, said predetermined number being equal to the ratio of the speed of a fastest channel and the speed of the channel being polled; the time lengths of said time intervals being near the time needed for filling a predetermined fraction of the buffer associated to the fastest channel.

According to an embodiment of the invention, all said time intervals have the same length equal to the time for filling said predetermined fraction of the buffer associated to the fastest channel.

According to another embodiment of the invention, the ratios of the channel speeds are powers of 2.

According to another embodiment of the invention, the following steps are carried out: storing in a second memory data arriving on the parallel channel by packets corresponding to the data stored in the buffers; as soon as the second memory is non empty, verifying for the following packets if the second memory has sufficient space for storing an additional packet; and as soon as the second memory does not have sufficient space for storing an additional packet, storing the data of the packet one by one and verifying if the second memory has sufficient space for storing an additional datum.

The invention also provides for a multiplexer comprising: a plurality of universal asynchronous transmitter/receivers (UARTs) operating at respective speeds; a buffer memory associated to each of the UARTs; a microprocessor connected to the UARTs and to the buffers through a bus; and means for polling each UART once every predetermined number of time intervals in a succession of time intervals and for then transferring the data stored in the associated buffer to the data bus, said predetermined number being equal to the ratio of the speed of a fastest UART and the speed of the UART being polled; the time lengths of said time intervals being near the time needed for filling a predetermined fraction of the buffer associated to the fastest UART.

According to another embodiment of the invention, said means for polling comprise a clock circuit having a frequency programmable through said bus, said microprocessor being interruptible by an output signal of this clock circuit, the period of the output signal being programmed at the time length for filling said predetermined fraction of the buffer associated to the fastest UART.

According to another embodiment of the invention, the ratios between UART speeds are powers of 2.

BRIEF DESCRIPTION OF THE DRAWINGS

The foregoing and other objects, features and advantages of the invention are exposed in detail in the following description of preferred embodiments by referring to the attached figures among which.

In order to more clearly understand the method of the invention, the following description will be based on a practical example which will be generalized subsequently.

Consider the example of a multiplexer, such as that of FIG. 1, having:

2 channels C1 and C2 at 38.4 kilobauds;
1 channel C3 at 19.2 kilobauds;
1 channel C4 at 9.6 kilobauds; and
2 channels C5 and C6 at 4.8 kilobauds.

Also assume that period $T_1$ corresponds to the arrival of 8 characters on a channel of 38.4 kilobauds;

Thus, at each period $T_1$, the FIFOs of channels C1 and C2 receive 8 characters, that of channel C3 receives 4 characters, that of channel C4 receives 2 characters, and those of channels C5 and C6 receive 1 character.

According to the conventional third operating mode previously described, channels C1 to C6 would be polled at each of periods $T_I$ and, for 24 characters, 6 channel-switching time intervals Ts and 1 interruption-processing time interval Tf would be spent.

According to the invention, it is only decided to poll a channel when there is a chance that its FIFO has received a predetermined number (8) of characters. It is therefore proceeded as follows:

at each period $T_I$, channels C1 and C2 are polled;
once every 2 periods, channel C3 is polled;
once every 4 periods, channel C4 is polled; and
once every 8 periods, channels C5 and C6 are polled.

Thus, when all the channels receive a continuous flow of characters, each of the channels is polled at an optimal moment when its FIFO is full of the same quantity as the other FIFOs. This quantity is, in a preferred embodiment, a quantity slightly smaller than that which causes the signal Xoff to be sent.

Recall the previously mentioned expression of the character processing efficiency of the conventional third operating mode:

$$r = \frac{m \cdot Tc}{Tf + n \cdot Ts + m \cdot Tc}$$

According to the invention in this example, number m remains the same because the same mean number of characters to be processed per period is the same as that of the conventional method, but number n which corresponds to the number of channels, instead of being 6 (six channels) according to the conventional method, is only $2 + \frac{1}{2} + \frac{1}{4} + 2/8 = 3$. Indeed, considering the method as seen in one period, channels C1 and C2 are processed once, channel C3 is processed half a time, channel C4 is processed quarter a time, and channels C5 and C6 are processed eighth a time.

Actually, in this example, half as many intervals Ts are spent than in the conventional method. Thus, the earned intervals Ts can be used to process characters coming on additional channels.

A plurality of cases can turn up in the implementation of the above described method. The table hereunder and FIG. 5 show the simplest case.

The first column of the table indicates the occurrence number of the considered period $T_I$. The four following columns respectively correspond to channels C1 and C2, C3, C4, C5 and C6. A cross in the column indicates that the channel is polled in the corresponding period $T_I$ of the left column.

| $T_I$ | $C_1/C_2$ | $C_3$ | $C_4$ | $C_5/C_6$ |
|---|---|---|---|---|
| 1 | X | | | |
| 2 | X | X | | |
| 3 | X | | | |
| 4 | X | X | X | |
| 5 | X | | | |
| 6 | X | X | | |
| 7 | X | | | |
| 8 | X | X | X | X |
| 9 | X | | | |
| 10 | X | X | | |
| 11 | X | | | |
| 12 | X | X | X | |

Figure 5:
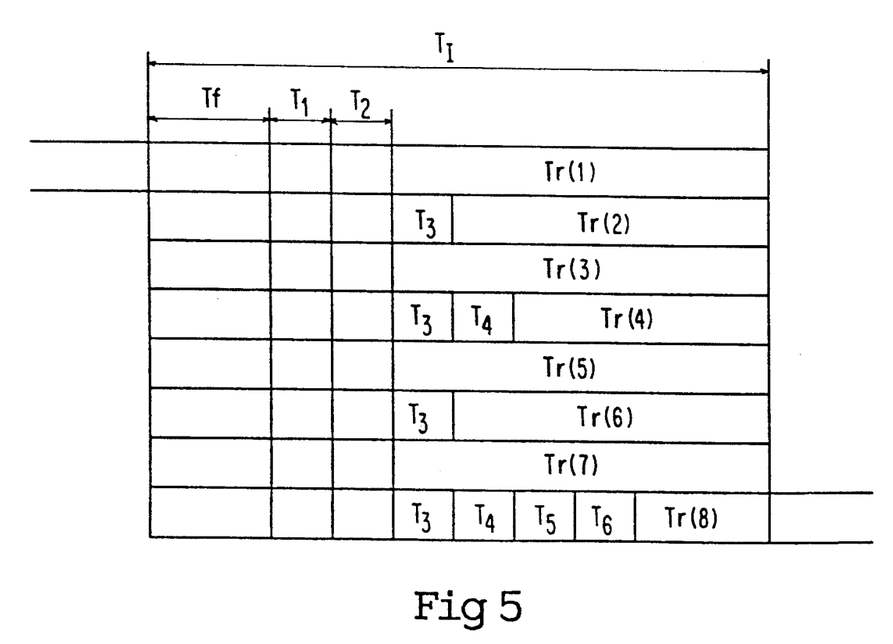
FIG. 5 represents processing times during a plurality of periods of an interruption signal, in an embodiment of a multiplexer according to the invention.

FIG. 5 shows with the same notations and symbolic representations as in the previous figures, eight successive periods $T_I$ corresponding to the eight first rows of the table.

This table shows the case where, for each of the channels, it is counted from the first period $T_I$ to know the period at which the channel must be polled. In other words, the counting origin for each of the channels is the same. By shifting the origin one row upwards for channel C3, it will only be needed to poll three channels at period 4 instead of four channels and only five channels at period 8 instead of six.

Also, if the origin for channel 4 is shifted two rows upwards, it will only be necessary to poll four channels at period 8 and three channels at the other periods. Thus, the method is then less limited in the total number of channels which can be treated in one period.

According to the invention, period $T_I$ is chosen with respect to the fastest channel, the speed of which can be different than the maximum speed (here 38.4 kilobauds). That is, period $T_I$, which can be conventionally programmed in clock CK, is chosen equal to the minimum time of partial filling of a fastest channel. In the previous example, the fastest speed was 38.4 kilobauds, which, for eight characters, corresponded to a filling time of approximately 2.1 milliseconds. If the fastest channel had been at 19.6 kilobauds, the filling time and thus period $T_I$ would have been multiplied by 2. When period $T_I$ is multiplied by 2, the sum of "useless" times, that is intervals Tf and Ts, is half as important and more time is left to process the characters.

Moreover, according to the invention, it is provided to optimize the transfer method of the characters into the RAM, and thus to optimize time Tc. To achieve this, the microprocessor carries out the following steps:

if the RAM is empty, the contents of a FIFO memory are transferred without verification into the RAM and it is switched to the following step for the coming characters;

the contents of a FIFO are transferred into the RAM and it is verified if there is enough place in the RAM to receive the contents of another FIFO;

if the space left in the RAM is insufficient for receiving the contents of a FIFO, the characters of the FIFO are written into the RAM one by one and it is checked for each character if there is enough place in the RAM for receiving another character;

if the RAM is full, polling of the channels is stopped and the content of the RAM is transferred to the external bus until the next beginning of a period $T_I$.

Thus, if the RAM is full when all the channels have not yet been processed, the FIFOs of the remaining channels attain the filling state which causes signal Xoff to be sent and the associated transmitting circuits 12 are set to a waiting state. The fact that the RAM is full means that the previously mentioned remaining time intervals Tr are too small for the microprocessor to be able to transfer the contents of the RAM to the external bus.

What is known in the art is to proceed according to the second step above and to switch to the fourth step when there is not enough place in the RAM for the contents of a FIFO. The verification time of the remaining space in the RAM, which is counted in time Ts, is important. Indeed, the first step is approximately three times smaller in the cited example of the 68000 microprocessor.

Moreover, the fact that the last remaining space of the RAM is exploited at the third step, which was not done in the art, diminishes the probability of Xoff signals to be sent.

The method according to the invention can be generalized to any number of channels operating at different speeds. Period $T_I$ is chosen to be equal to the duration of the filling of a fastest channel FIFO before a signal Xoff is sent. Any channel operating at a speed k times smaller that the speed of the fastest channels is polled once every k periods.

Many alternatives and modifications of the present invention will appear to those skilled in the art. The method can be carried out by a program executed by the microprocessor or it can be carried out by logic circuits. The sizes of the FIFOs and of the RAM can have any value and the greater they are, the more the method will be efficient.

Although the method has been described with periodical interruptions, it can also be implemented without interruptions by a program executed in an endless loop, such as for the conventional second multiplexing method.

I claim:

1. Method of transferring data to a receiving channel, the data being provided by a plurality of serial channels each having a respective operating speed and including a buffer memory for storing said data, the operating speed of at least one of the serial channels differing from the operating speed of the others of the serial channels, said method comprising the steps of:

polling each serial channel once every predetermined number of time intervals among a succession of time intervals; and transferring the data stored in the buffer memory of each polled serial channel to said receiving channel, said predetermined number of polling time intervals being equal to the ratio of the fastest operating speed of said plurality of serial channels and the operating speed of the serial channel being polled, and the time lengths of said time intervals being near the time needed for filling a predetermined fraction of the buffer memory of the serial channel having said fastest operating speed.

2. The method of claim 1, wherein the time length of all said time intervals are the same and is equal to the time for filling said predetermined fraction of the buffer memory having said fastest operating speed among said plurality of serial channels.

3. The method of claim 2, wherein the ratios between operating speeds of said plurality of serial channels are powers of two.

4. Method of claim 1, wherein the ratios between operating speeds of said plurality of serial channels are powers of two.

5. Method of transferring data to a receiving channel, the data being provided by a plurality of serial channels each having a respective operating speed and including a buffer memory for storing said data, the operating speed of at least one of the serial channels differing from the operating speed of the others of the serial channels, said method comprising the steps of:

polling each serial channel once every predetermined number of time intervals among a succession of time intervals;

transferring the data stored in the buffer memory of the polled serial channel to said receiving channel is packets of data;

storing the data transferred to said receiving channel in a second memory;

determining if the second memory is not empty;

if the second memory is determinded not to be empty, then determining, for subsequent packets of data, if the seocnd memory has sufficient space to store an additional data packet; and if said determining step indicates the second memory does not have sufficient space to store the additional data packet, storing the additional data packet datum by datum and verifying, after each datum is stored, whether the second memory has sufficient space for storing an additional datum, said predetermined number of time intervals for polling a respective serial channel being equal to the ratio of the fastest operating speed among the operating speeds of said plurality of serial channels and the operating speed of the serial channel being polled, and the time lengths of said time intervals being near the time needed for filling a predetermined fraction of the buffer memory of the serial channel having said fastest operating speed.

6. A system for transferring data to a bus comprising:

a plurality of universal asynchronous transmitter/receivers (UARTs) each having a respective operating speed and including a buffer memory for storing data, the operating speed of at least one UART differing from the operating speed of the other UARTs;

a microprocessor connected to said plurality of UARTs and to the buffer memories through the bus; and means for polling each UART once every predetermined number of time intervals among a succession of time intervals and transferring said data stored in the buffer memory of the polled UART to the bus, said predetermined number of time intervals for polling a respective UART being equal to the ratio of the fastest operating speed among the operating speeds of said plurality of UARTs and the operating speed of the UART being polled, wherein the time lengths of said time intervals are near the time needed for filling a predetermined fraction of the buffer memory of the UART having said fastest operating speed.

7. The system of claim 6, wherein the ratios between operating speeds of said plurality of UARTs are powers of two.

8. A system for transferring data to a bus comprising:

a plurality of universal asynchronous transmitter/receivers (UARTs) each having a respective operating speed and including a buffer memory for storing data, the operating speed of at least one UART differing from the operating speed of the other UARTs;

a microprocessor connected to said plurality of UARTs and to the buffer memories through the bus; and means for polling each UART once every predetermined number of time intervals among a succession of time intervals and transferring said data stored in the buffer memory of the polled UART to the bus, said predetermined number of time intervals for polling a respective UART being equal to the ratio of the fastest operating speed among the operating speeds of said plurality of UARTs and the operating speed of the UART being polled, the time lengths of said time intervals being near the time needed for filling a predetermined fraction of the buffer memory of the UART having said fastest operating speed, said means for polling including a clock circuit outputting a signal having a frequency set in response to a signal provided on said bus, said microprocessor being interruptible by the output signal of said clock circuit, the period of the output signal equaling the time length for filling said predetermined fraction of the buffer memory of the UART having said fastest operating speed.

9. The system of claim 8, wherein the ratios between operating speeds of said plurality of UARTs are powers of two.

* * * * *

UNITED STATES PATENT AND TRADEMARK OFFICE
CERTIFICATE OF CORRECTION

PATENT NO. : 5,311,505
DATED : May 10, 1994
INVENTOR(S) : Mathieu ANTOINE

It is certified that error appears in the above-indentified patent and that said Letters Patent is hereby corrected as shown below:

Col. 1, line 40, change "12" to --I2--.

Col. 2, line 35, change "such" to --much--.

Col. 2, line 58, change "means" to --mean--.

Col. 2, line 66, change "subprogram(s)" to --sub-program(s)--.

Col. 3, line 2, change "subprogram" to --sub-program(s)--.

Col. 3, line 30, change "12" to --I2--.

Col. 3, line 32, change "12" to --I2--.

Col. 3, line 35, change "12" to --I2--.

Col. 3, line 38, change "$T_1$" to --$T_I$--.

Col. 3, line 39, change "12" to --I2--.

Col. 3, line 52, change "$T_I$" to --$T_I$--.

Col. 3, line 62, change "$T_I$" to --$T_I$--.

Col. 3, line 66, change "$T_I$" to --$T_I$--.

Col. 3, line 66, change "means" to --mean--.

UNITED STATES PATENT AND TRADEMARK OFFICE
CERTIFICATE OF CORRECTION

PATENT NO. : 5,311,505
DATED : May 10, 1994
INVENTOR(S) : Mathieu ANTOINE

It is certified that error appears in the above-indentified patent and that said Letters Patent is hereby corrected as shown below:

Col. 3, line 67, change "$T_I$" to --$T_I$--.

Col. 4, line 20, change "$T_I$" to --$T_I$--.

Col. 4, line 23, change "$T_I$" to --$T_I$--.

Col. 6, line 1, change "$T_l$" to --$T_I$--.

Col. 6, line 7, change "$T_I$" to --$T_I$--.

Col. 6, line 14, change "$T_I$" to --$T_I$--.

Col. 6, line 50, change "$T_I$" to --$T_I$--.

Col. 6, line 54, change "$T_I$" to --$T_I$--.

Col. 6, line 56, change "$T_I$" to --$T_I$--.

Col. 7, line 3, change "$T_I$" to --$T_I$--.

Col. 7, line 6, change "$T_I$" to --$T_I$--.

Col. 7, line 18, change "$T_I$" to --$T_I$--.

Col. 7, line 21, change "$T_I$" to --$T_I$--.

Col. 7, line 28, change "$T_I$" to --$T_I$--.

Col. 7, line 29, change "$T_I$" to --$T_I$--.

UNITED STATES PATENT AND TRADEMARK OFFICE
CERTIFICATE OF CORRECTION

PATENT NO. : 5,311,505
DATED : May 10, 1994
INVENTOR(S) : Mathieu ANTOINE

It is certified that error appears in the above-indentified patent and that said Letters Patent is hereby corrected as shown below:

Col. 7, line 51, change "$T_I$" to --$T_I$--.

Col. 8, line 7, change "$T_I$" to --$T_I$--.

Col. 9, line 3, change "is" to --in--.

Col. 9, line 28, delete the "-" (hyphen).

Col. 10, line 11, delete the "-" (hyphen).

Signed and Sealed this

Thirteenth Day of June, 1995

*Attest:*

BRUCE LEHMAN

*Attesting Officer*   *Commissioner of Patents and Trademarks*